United States Patent [19]

Barth

[11] 4,240,353
[45] Dec. 23, 1980

[54] ROLLER CONVEYOR CARRIAGE AND LADING SUPPORTING RACK

[76] Inventor: C. Richard Barth, 2908 Rockbrook Dr., Plano, Tex. 75074

[21] Appl. No.: 890

[22] Filed: Jan. 4, 1979

[51] Int. Cl.³ .................. B61B 3/00; B61F 11/00; B65G 17/34
[52] U.S. Cl. .................... 104/93; 105/150; 105/156; 198/646; 211/162; 280/47.24; 414/134
[58] Field of Search ............ 104/91, 93; 105/150, 105/156; 108/108; 198/601, 646, 648, 678, 681, 687; 280/47.24; 414/134, 207; 211/41, 162

[56] References Cited

U.S. PATENT DOCUMENTS

| | | | |
|---|---|---|---|
| 1,128,938 | 2/1915 | Boudreaux | 108/108 |
| 1,454,675 | 5/1923 | Gantvoort | 414/207 |
| 1,550,248 | 8/1925 | Gehnrich | 198/681 |
| 1,727,547 | 9/1929 | Knoll | 104/93 |
| 2,017,404 | 10/1935 | Lorig | 104/93 |
| 2,471,347 | 5/1949 | Rayburn | 105/156 X |
| 2,479,680 | 8/1949 | Hamilton, Jr. | 198/687 |
| 2,967,081 | 1/1961 | Kleinpenning | 414/134 X |
| 3,057,305 | 10/1962 | Behrens | 105/150 |
| 3,139,966 | 7/1964 | Sheets et al. | 198/601 X |
| 3,265,404 | 8/1966 | Skufca | 211/162 X |
| 3,338,420 | 8/1967 | McClenny | 198/678 X |
| 3,368,688 | 2/1968 | Weiss et al. | 198/678 X |
| 4,003,315 | 1/1977 | Barth | 105/156 X |

Primary Examiner—Howard Beltran
Attorney, Agent, or Firm—James M. Peppers

[57] ABSTRACT

A lading support carrier for handling packaged goods in conjunction with an overhead conveyor, such as a monorail conveyor. Includes a support member suspendable in generally upright position from the conveyor and spaced apart, generally outstanding bars hingeable and detachably connected thereto to receive the goods such as package goods to be moved. Provision is made for suspending the support rack for movement along an overhead conveyor. The outstanding bars may be selectively hinged in aligned relation with respect to the upright support member to vary the space between any two extending support bars to accomodate larger packages or goods. All outwardly extending support bars may be hinged for greater convenience in handling and/or shipping. Where used in a food processing plant, the outstanding bars may be readily removed for sterilization and quickly replaced. The material from which the unit is made may be provided of substantially corrosion proof and impermeable material.

An improved alternate embodiment of the invention has the support carrier provided as an integral and unitary structure with no open joints, seams or crevices wherein food or other biodegradable substances may be lodged or retained.

3 Claims, 10 Drawing Figures

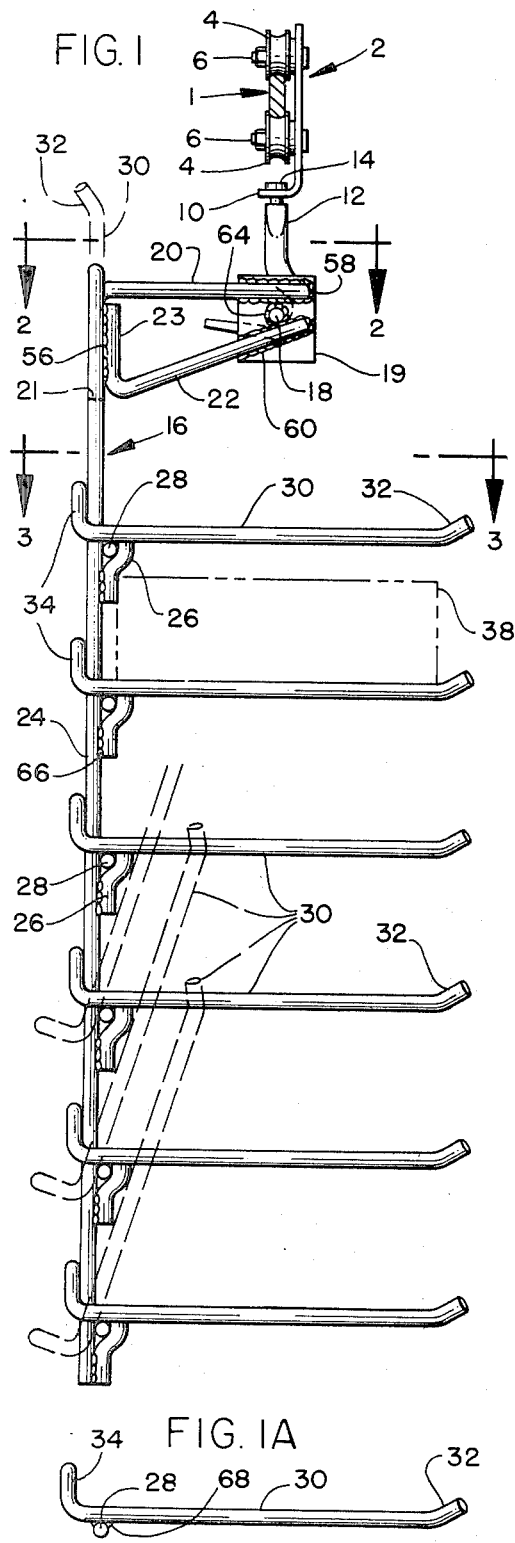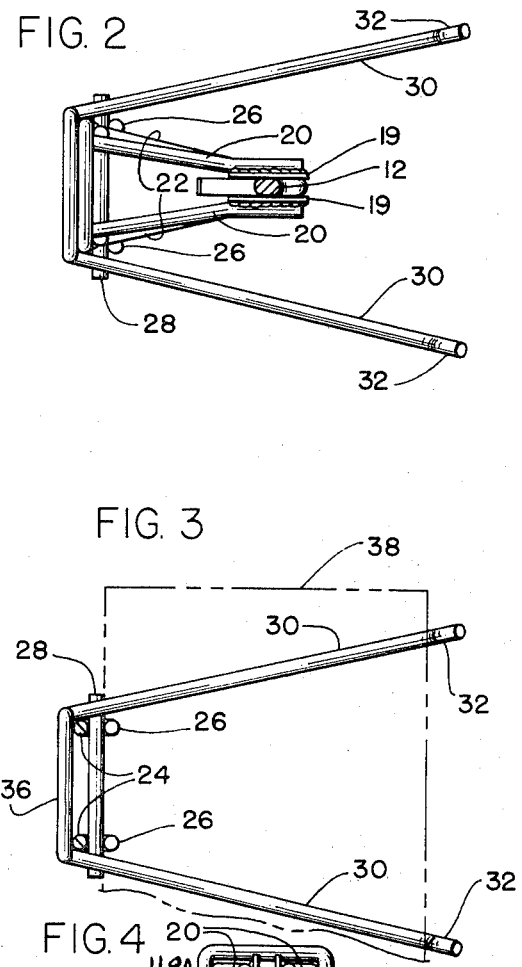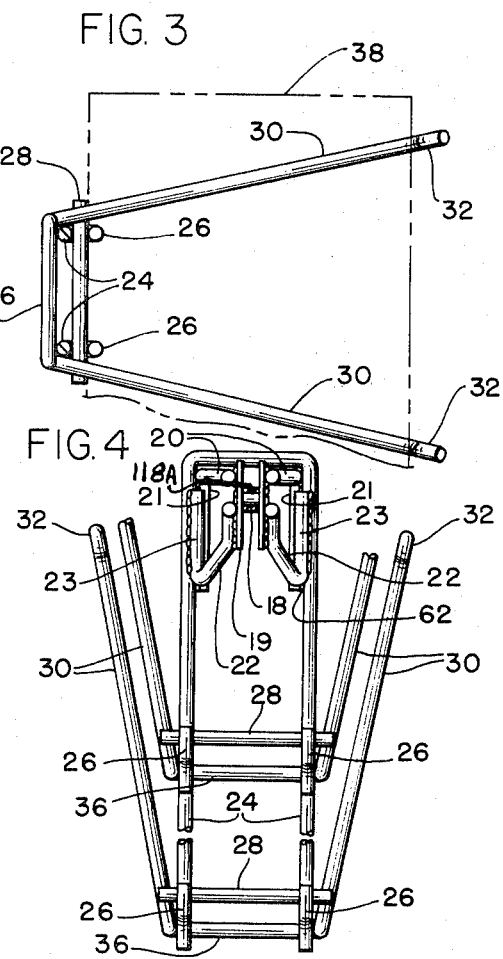

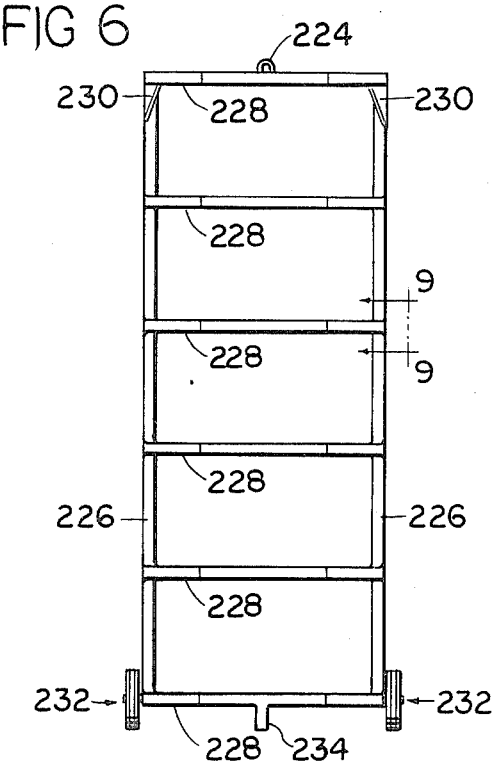
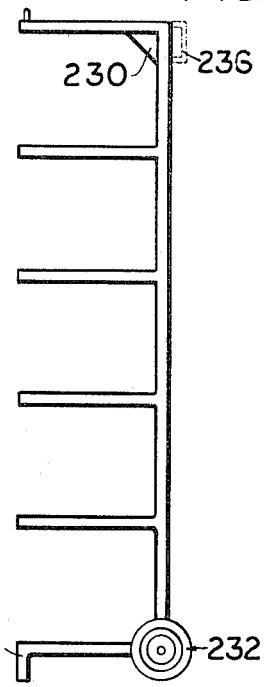
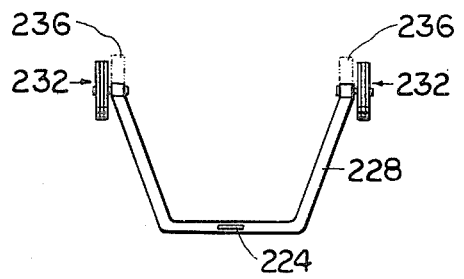
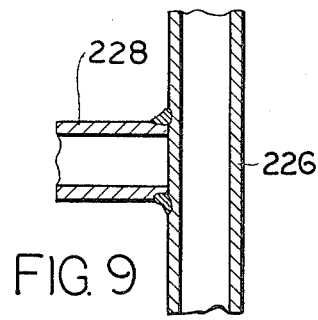
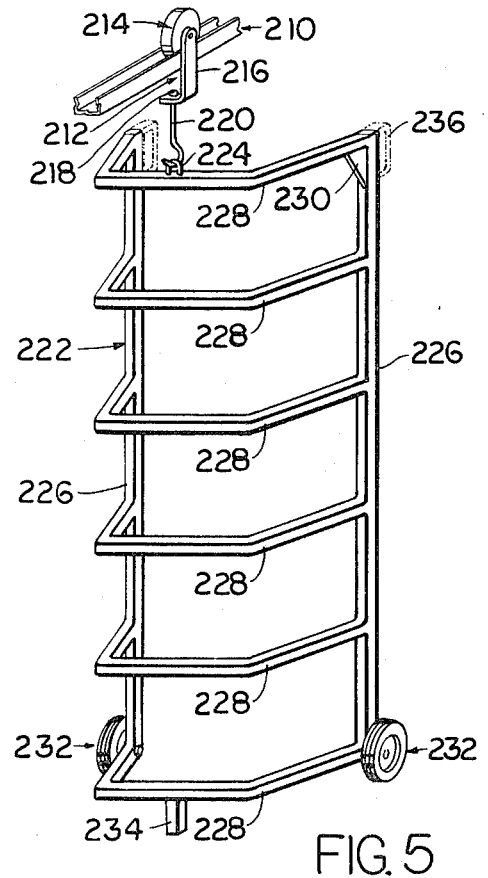

ROLLER CONVEYOR CARRIAGE AND LADING SUPPORTING RACK

BACKGROUND OF THE INVENTION

This invention pertains to an improved alternate embodiment of lading carriers as disclosed in my U.S. Pat. No. 4,003,315, issued Jan. 18, 1977.

The handling of boxed meats or other packaged or boxed products on a monorail conveyor has heretofore lacked the flexibility of the tiered carrier of this invention which can be suspended through a swivel member so that the boxes or packages can be removed from the side of the carrier. Also, the boxes or packages may be readily moved from an upper tier to a lower tier so as to keep the packages which are ready for distribution at a convenient position for handling.

The outwardly extending bar support units, which form a tier, may be selectively folded to give greater space between tiers to accomodate boxes or packages of greater size. The construction may be such that the outwardly extending bar units which form the tiers may be removed for cleaning and/or storage or where the vertical support members and the extending bar units may be formed as an integral tiered carrier with substantially no seams, crevices or joints in the exterior surfaces of the carrier.

SUMMARY OF THE INVENTION

This invention relates to a carrier for use with an overhead conveyor to facilitate the handling of products, particularly packaged or boxed products. The conveyor may be a monorail conveyor and the carrier may be connected thereto by means of an included swivel. Vertically spaced apart, outwardly extending support bars are attached to an upright support member, which member is attached to the conveyor. Boxes or packages are placed on the outwardly extending spaced apart support bars to be conveyed to a storage vault or to a place of unloading. For the handling of some merchandise, such as packaged meat, the carrier may be installed in a refrigerated vault, and the meat, as normally boxed in sealed cartons, may be placed on the carrier in such manner that the notations as to the contents and the date of packaging may be readily seen. The carrier then may be moved along on the conveyor to a specified location in the vault to allow for proper aging and later moved to a suitable place for distribution. A multiplicity of carriers may be used on the same conveyor to meet a multiplicity of situations with a minimum of manual effort. One form of the carrier provides for the removal of the "V" or "U" shaped, outwardly extending support bar units from the carrier for sterilization and for shipping, or all the bar units may be hingeable folded upward on the inverted, generally U-shaped member to occupy a minimum of space. The carrier may be made of corrosion resistant material, such as stainless steel, or may be coated with plastic or the like to preclude rusting of the parts thereof. The units may be made of solid rods, structural members, tubular members of various cross sections such as round, elliptical or rectangular, to present great strength with a minimum of weight.

OBJECTS OF THE INVENTION

An object of this invention is to provide a tiered carrier for products, which carrier comprises horizontally and vertically spaced apart bars, to enable the tiered carriers to be moved along a conveyor.

Another object of the invention is to provide a wheeled carrier for a conveyor, which has outwardly extending and vertically spaced apart support bars to enable products to be placed thereon for movement along a conveyor.

Yet another object of the invention is to provide a wheeled carrier for use on a conveyor, which carrier has normally outwardly extending, vertically spaced apart support bars.

Yet another object of the invention is to provide an upright support on which is mounted outwardly extending, vertically spaced apart bars, which bars receive boxed products therein in such manner that the containers may be labeled as to content, date of packaging and such other information as is necessary to properly classify the merchandise, which carrier may be turned or swiveled so that the markings on the containers may be readily identifiable for ready disposition of the goods along the length of the conveyor.

Another object of the invention is to provide an outwardly extending bracket which has a support means thereon which is complementary for suspended support from a conveyor rail so that the support means on the bracket will be aligned with the center of gravity of the carrier.

A further object of an embodiment of the invention is to provide a tiered carrier of which the support member and the outwardly extending bars are of tubular construction joined as an integral unit without joints, seams or crevices which could retain undesirable materials.

BRIEF DESCRIPTION OF THE DRAWINGS

With the forgoing and other objects in mind, reference is to be had to the accompanying drawings in which respective reference members designate corresponding parts in the several views thereof, in which:

FIG. 1 is a side elevational view of a prior art material carrier for a conveyor, showing an upright support member with outwardly extending support bars spaced apart vertically and hingeably and detachably connected to the upright support member, and showing an outwardly extending bracket with a load support member for complementary attachment to a support member on the conveyor so as to be substantially above the center of gravity of the load on the support bars;

FIG. 1A is a side elevational view of one of the outwardly extending support bars, shown apart from the support member;

FIG. 2 is a sectional view taken on the line 2—2 of FIG. 1, looking in the direction indicated by the arrows, and showing the top plan view of the upright, inverted U-shaped support member to which outwardly extending, V-shaped support bars are hingeably connected for hinging into aligned relation with the upright support member or for removing from the upright support member;

FIG. 3 is a sectional view taken on the line 3—3 of FIG. 1, looking in the direction indicated by the arrows, showing the outwardly extending, V-shaped bars having the upstanding portion on the rear thereof in biased relation with the upright support member, and showing outwardly extending yokes secured to the upright support member to receive a shaft therein;

FIG. 4 is a fragmentary front elevational view, with the carrier being shown apart from the monorail, with parts being broken away and shortened to show the V-shaped bars in folded condition, with the V-shaped support bars being in substantially parallel aligned relation with the inverted, U-shaped support member;

FIG. 5 is a front-side perspective view of an improved alternate embodiment of the invention being of tubular construction, with an inverted, compound, generally U-shaped upright support member; the support bars are shown to be generally of U-shape with the distal ends of each bar being in connection with a respective leg of the support member;

FIG. 6 is the front elevational view of the carrier member structure;

FIG. 7 is a side elevational view of the carrier member structure;

FIG. 8 is a plan view of the carrier members taken as disconnected from the roller carriage element; and FIG. 9 is a fragmentary sectional view taken on a section line 9—9 of FIG. 6 looking in the direction indicated by the arrow.

DESCRIPTION OF THE INVENTION

With more detailed reference to the drawings, the numeral 1 designates a suspended monorail conveyor having a roller carriage 2 supported thereon, which carriage rolls on wheels 4 over and below the monorail conveyor 1 and which wheels are journaled on axes 6 mounted on the upright bar 8 of the carriage 2. The bar 8 has an inturned portion 10 beneath the monorail conveyor 1 to which a load bearing carrier or hook 12 is attached by pivot or swivel means 14 in such manner as to enable the tiered carriers, designated generally at 16, to be supported on bar 18.

The carrier 16 has the center of gravity directly below the pivot 14 and has a support member 18 to complementally engage the support member 12 on the on the roller carriage 2. The support member 18 is a pin which extends between a pair of spaced apart plates 19 to which the pin 18 is welded. The plates 19 are supported on outwardly extending brackets 20 and 22, which brackets are secured to an inverted, upright, U-shaped member 24. The braces 20 are welded to plates 19 and extend between portions of the inverted, U-shaped member 24 near the upper end thereof. The braces 20 have downturned ends 21 which are welded to the inner sides of the portions of the U-shaped member 24, as will best be seen in FIGS. 2 and 4.

The braces 22 are welded to spaced apart plates 19 and have the distal end portions 23 thereof upturned and welded along the adjacent side of each portion of the inverted, U-shaped, upright support member 24, as is best seen in FIG. 1.

The inverted, U-shaped, upright member 24 has spaced apart yokes 26 thereon and secured thereto in transverse aligned relation on one side of the respective upright bars 24 of the inverted, U-shaped, upright member 24. The yokes 26 are of a size to receive a transverse shaft 28 therein to support the shaft in a substantially horizontal position between each pair of yokes, as is best seen in FIG. 4.

Outwardly extending, V-shaped bar units 30 are fixedly secured, as by welding, on their lower sides to the transverse shaft 28, each which shaft is fitted within a pair of transversely aligned, spaced apart yokes 26 and is journaled therein adjacent the respective spaced apart, upright, members 24, which upright, inverted, U-shaped member is preferably made on a single piece of material, as will best be seen in FIGS. 1, 2, and 4.

The outwardly extending bar units 30 are preferably upturned on the distal ends thereof, as indicated at 32, and each unit has an upturned portion 34, which has a portion 36 which extends transversely across the upright, U-shaped member 24 on the side thereof opposite the transverse shafts 28. The transverse portion 36 is supported or biased against the upright, U-shaped bars, when the support bars units 30 are in outwardly extending position. This gives rigidity to the V-shaped support bar units 30. The outwardly extending, V-shaped bar units 30 may be hinged upwardly until the bars lie in aligned relation with the inverted, U-shaped support member 24, so as to occupy a minimum of space for storage and shipment.

In the form of the invention as shown in FIGS. 1 through 4, the normally outwardly extending bar units 30 may be moved upwardly out of the yoke 26, which enables these V-shaped support bar units 30 to be moved upwardly into a position substantially as shown in dashed outline in FIG. 1, and when the shaft 28 of each is attached to the V-shaped bar unit 30 and moved upwardly and downwardly, the unit may be removed from the inverted, U-shaped, upright member 24. With the normally outwardly extending support bar units 30 thus removed, the units may be readily packed for shipment or sterilized in a relatively small vat, and subsequently reinserted into the yokes in inverse manner. The yokes 26 are welded, as shown to the upright support members 24.

In addition to being removable, the normally outwardly extending V-shaped support bar units may be selectively hinged upwardly, for instance every other unit, until the support bar unit is in aligned relation with the upright support member 24. In this manner, larger boxes may be loaded between the outwardly extending V-shaped bar units 30.

While only six outwardly extending, V-shaped bar units 30 have been shown in the present instance, any number of such units and any spacing may be provided so long as the distance between the support pin 18 and the floor level gives sufficient clearance for the carrier 16 to pass.

The tiered material carrier is particularly adaptable to conveying "boxed" meat, which boxes may be properly marked with numbers, date and the identifying data as to type meat within the container. As the meat becomes aged, it can be progressively moved downward until it reaches the bottom tier. In this manner the meat may be properly aged in a refrigerated vault and be in position for unloading and shipping at the proper time. Furthermore, a plurality of tiered carriers may be suspended along the monorail, so that either a certain cut of meat, such as shoulder or hind quarter, may be boxed and placed on individual tiered carriers with properly labeled with the identifying date, so that it can be readily located and moved to the proper place, either to remain for aging or to be unloaded for distribution.

The present device is particularly adaptable for use in refrigerated vaults, as it can be made of corrosion proof material, or it can be coated with plastic material or the like to prevent rust.

The normally outwardly extending V-shaped bar units are so arranged as to enable relatively long boxes 38 to be placed upon the outwardly extending V-shaped bar units 30 and be stable thereon while also enabling the bars to be folded upward in overlapping relation, as shown in FIG. 4, when the device is not in use.

IMPROVED ALTERNATE EMBODIMENT OF THE INVENTION

FIGS. 5-9 disclose another improved embodiment of the invention having a relatively light lading carrier member 222 suspended in vertical support from a "U"-channel type conveyor 210 through a roller carriage means 212.

To attain a structure which is relatively light yet of maximum strength, carrier member is provided of tubular construction. The tubing is shown of box or rectangular cross-section for ease in forming, welding and the like; however, the carrier member 222 may utilize members of any cross-section which will meet the requirements of strength, light weight and ready and thorough cleaning of the fabricated structure.

Carriage means 212 includes a roller means 214 supported within the "U" of and movable along conveyor 210. Roller 214 is connected to an inwardly turned hanger means 216 which, at its inturned end, accommodates a swivel means 218 to which is connected a horizontally rotatable hook member 220. In readily detachable relation, hook 220 is disposed within the eye of a loop 224 which is securely fixed, as by welding, to the top of the carrier member 222 so that vertical support of carrier 222 is attained through loop 224, hook 220, swivel 218, hanger 216 and roller 214.

It is preferably and usual to provide several (not shown) of the roller carriage/carrier member combinations 212/222 sequentially supported from conveyor 210 along its length. Each such combination 212/222 may be independently movable, as by hand, or the sequence of combinations may be connected together in spaced apart relation along a chain or cable, for example, and the entire sequence of combinations moved by a motor, as appropriate.

The carrier member 222 as shown generally includes generally vertical support legs 226 to which is connected as by welding a plurality of generally "U" shaped support brackets 228 in spaced apart relation along and at generally right angles to legs 226. The uppermost bracket 228 has affixed thereto the loop 224 as previously described. As best understood from FIGS. 5, 7, and 8, the loop 224 is positioned and mounted off the center of gravity of the carrier member 222 whereby the vertical support legs 226 will be inclined off the vertical to some extent when carrier 222 is suspended from the hook 220 which causes the support brackets 228 to be inclined downwardly toward the legs 226. Thus, when the carrier 222 is suspended, products loaded onto the support brackets will be prevented from sliding off.

To assist in insuring support to carrier member 222 and various lading weights, a gussett member 230 may be fixed as by welding to the fixed intersecting connection of the top bracket member 228 and to each support leg 226. It is to be noted that only one support leg 226 is essential for carrier member 222, in which case the support brackets 228 would be formed as loops (not shown) fixed to a single support leg 224.

As means for utilizing lading carrier 222 with significant convenience as both a lading carrier and a transporting dolly, the carrier 222 may be equipped with dolly wheel means 232 fixed to each support leg 226, as best shown in FIGS. 5 and 7, and, to maintain the carrier 222 in upright position when wheels 232 are resting on a horizontal surface, a short level leg 234 is fixed to the bottom bracket 228 as shown.

Thus, when provided as shown in FIG. 5 and under assumed yet typical conditions, the empty carrier 224 may be readily disconnected from the roller carriage of combination 212/222, leaving roller carriage 212 on conveyor 210, and the carrier, in its role as a dolly, then rolls to a place for loading such as a refrigerated truck or railway car, for example. When loaded with lading such as meat packages, the carrier may then be rolled back to the conveyor and reconnected to the hook 220, or any hook 220 if several roller carriages are provided along conveyor 210. The lading may then be moved into storage and out again for unloading onto another truck, or, into a butcher shop, for example.

In order for a person to conveniently manipulate carrier member 222 when it is employed as a dolly, handles 236 may be connected to each of support legs 226, as shown in dashed lines, or a handle bar (not shown) may be connected between the upper ends of legs 226. The handles 236 provide the additional feature of serving with wheels 232 as supports to hold the carrier member 222 off the surface when the carrier member is laid down in horizontal position.

As previously mentioned with respect to the embodiment of FIG. 1, the carrier member 222 and the roller carriage 212 is preferably provided of non-corrosive, readily cleanable material such as stainless steel.

For ready compliance with generally accepted cleaning and sanitation requirements, all of both roller carriage member 212 and carrier member 222 should be provided free and devoid as possible of any seams, cracks, crevices or the like where dirt, organic materials or the like might tend to accumulate or be retained. As generally shown in FIGS. 5-9, all connection joints are to be welded and the open ends of all tubular members closed off to present smooth seamless surfaces which may be easily cleaned when washed or steamed.

The forgoing description and drawing will suggest other embodiments and variations to those skilled in the art, all of which are intended to be included in the spirit of the invention as herein described and defined:

That being claimed is:

1. In an article of manufacture adapted for transfer of products on a conveyor having hook means through stages of processing while allowing interim storage of such products, the combination comprising:
   (a) a tiered carrier including suspension means with at least two vertical support legs connected to said suspension means and mounted to provide and maintain a substantially upright posture of said tiered carrier when suspended from said hook means;
   (b) a plurality of vertically spaced apart support brackets rigidly connected substantially at right angles to said vertically disposed support legs;
   (c) each of said support brackets forming a "U"-shaped element joined at each of its ends to said vertical support legs;
   (d) said suspension means comprising the uppermost support bracket of said support brackets, a hook receiving loop mounted on said upper most bracket to supportably receive in readily removable relation said hook means, and reinforcing gussett members connecting each connection of said uppermost support bracket with said vertical support means; and
   (e) said hook loop being mounted and spaced sufficiently with respect to the center of gravity of the carrier to incline said vertical support legs at an angle to the verticle when suspended to prevent products loaded on the support brackets and engaging the support legs from sliding off said support brackets while said carrier is supported from said hook means.

2. The article of claim 1 wherein said tiered carrier is provided with wheels with each leg to thereby permit said carrier means to additionally function as a wheeled dolly.

3. The article of claim 2 wherein said carrier is provided with extending handles near the upper end of said vertical support legs adapted to serve, with said wheels, to hold said vertical support legs off a surface when said article is laid down in horizontal position.

* * * * *